(12) United States Patent
Pei et al.

(10) Patent No.: US 12,542,009 B2
(45) Date of Patent: Feb. 3, 2026

(54) IN-VEHICLE NETWORK ACCESS METHOD AND DEVICE, STORAGE MEDIUM AND CHIP

(71) Applicant: XIAOMI EV TECHNOLOGY CO., LTD., Beijing (CN)

(72) Inventors: Suyu Pei, Beijing (CN); Xin Liang, Beijing (CN); Zhibo Chang, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 18/516,744

(22) Filed: Nov. 21, 2023

(65) Prior Publication Data

US 2024/0412567 A1    Dec. 12, 2024

(30) Foreign Application Priority Data

Jun. 12, 2023   (CN) .......................... 202310694117.3

(51) Int. Cl.
*G07C 5/00*        (2006.01)
*H04L 9/40*        (2022.01)
*H04W 4/40*        (2018.01)
*H04W 12/04*       (2021.01)

(52) U.S. Cl.
CPC ............ *G07C 5/008* (2013.01); *H04W 12/04* (2013.01)

(58) Field of Classification Search
CPC ........ G07C 5/008; H04W 12/04; H04W 4/40; H04W 12/009; H04W 12/08; H04W 12/50; H04W 12/069; H04W 48/08; H04W 48/16; H04L 63/0823; H04L 63/083

USPC ....................................................... 701/31.4
See application file for complete search history.

(56) References Cited

U.S. PATENT DOCUMENTS

| | | | |
|---|---|---|---|
| 2019/0075423 A1* | 3/2019 | Hrabak | H04W 76/14 |
| 2019/0110334 A1* | 4/2019 | Raje | H04W 88/085 |
| 2019/0380034 A1* | 12/2019 | Montemurro | H04W 12/08 |
| 2020/0274868 A1 | 8/2020 | Passaglia et al. | |
| 2022/0321934 A1* | 10/2022 | Tian | H04N 21/25841 |
| 2024/0412567 A1* | 12/2024 | Pei | G07C 5/008 |

FOREIGN PATENT DOCUMENTS

EP    3357170 B1    5/2020

OTHER PUBLICATIONS

European Patent Application No. 23213482.5, Search and Opinion dated Jan. 25, 2024, 8 pages.

* cited by examiner

*Primary Examiner* — Tyler D Paige
(74) *Attorney, Agent, or Firm* — Cozen O'Connor (57) ABSTRACT

An in-vehicle network access method applied to a vehicle includes: acquiring device information of a to-be-networked device through a first network, in response to detecting that the to-be-networked device accesses the first network of the vehicle; verifying whether the to-be-networked device meets a networking condition or not based on the device information; and sending a network access certificate of a second network of the vehicle to the to-be-networked device in response to the to-be-networked device meeting the networking condition, wherein the network access certificate allows the to-be-networked device to access the second network, the first network is an open wireless network of the vehicle, and the second network is an encrypted wireless network of the vehicle.

20 Claims, 7 Drawing Sheets

IN-VEHICLE NETWORK ACCESS METHOD AND DEVICE, STORAGE MEDIUM AND CHIP

CROSS-REFERENCE TO RELATED APPLICATION

This application is based on and claims priority to Chinese Patent Application No. 202310694117.3 filed on Jun. 12, 2023, the entire content of which is incorporated herein by reference.

BACKGROUND

With the development of vehicles and Internet of Things technology, more and more artificial intelligence plus Internet of Things (AI+IoT, hereinafter "AIOT") devices are applied to vehicle systems, and the AIOT devices need to be connected to vehicular Wi-Fi before they access internet services through a vehicular Wi-Fi network.

In the related art, when an AIOT device capable of human-computer interaction is connected to a Wi-Fi network of a vehicle, a user performs an operation of accessing the Wi-Fi network through a human-computer interaction interface of the AIOT device. However, when an AIOT device without the human-computer interaction capability (e.g., an AIOT device without a display screen) wants to be connected to the Wi-Fi network of the vehicle, the user cannot access the Wi-Fi network of the vehicle through the above operation.

SUMMARY

The present disclosure relates to the field of communication technology, and more particularly to an in-vehicle network access method and device, a storage medium, and a chip.

According to a first aspect of embodiments of the present disclosure, there is provided an in-vehicle network access method performable at a vehicle. The in-vehicle network access method includes: acquiring device information of a to-be-networked device through a first network, in response to detecting that the to-be-networked device accesses the first network of the vehicle; verifying whether the to-be-networked device meets a networking condition or not based on the device information; and sending a network access certificate of a second network of the vehicle to the to-be-networked device in response to the to-be-networked device meeting the networking condition, wherein the network access certificate allows the to-be-networked device to access the second network, the first network is an open wireless network of the vehicle, and the second network is an encrypted wireless network of the vehicle.

According to a second aspect of embodiments of the present disclosure, there is provided an in-vehicle network access method performable by a to-be-networked device. The in-vehicle network access method includes: accessing a first network of a vehicle in response to detecting the first network; sending device information of the to-be-networked device to the vehicle through the first network, wherein the device information verifies whether the to-be-networked device meets a networking condition by the vehicle; receiving a network access certificate of a second network sent by the vehicle in response to the to-be-networked device meeting the networking condition; and accessing the second network by using the network access certificate, wherein the first network is an open wireless network of the vehicle and the second network is an encrypted wireless network of the vehicle.

According to a third aspect of embodiments of the present disclosure, there is provided an in-vehicle network access device performable at a vehicle. The in-vehicle network access device includes: a processor; and a memory for storing processor-executable instructions; in which the processor is configured to execute a computer program in the memory to: acquire device information of a to-be-networked device through a first network, in response to detecting that the to-be-networked device accesses the first network of the vehicle; verify whether the to-be-networked device meets a networking condition or not based on the device information; and send a network access certificate of a second network of the vehicle to the to-be-networked device in response to the to-be-networked device meeting the networking condition, wherein the network access certificate allows the to-be-networked device to access the second network, the first network is an open wireless network of the vehicle, and the second network is an encrypted wireless network of the vehicle.

BRIEF DESCRIPTION OF DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations described in the following embodiments do not represent all implementations consistent with the disclosure. Instead, they are merely examples of an apparatus and a method consistent with some aspects related to the disclosure as recited in the appended claims.

It should be noted that all actions of acquiring signals, information or data in the present application are performed under the premise of complying with the corresponding data protection regulations and policies of the country of the location and in a case of obtaining an authorization given by an owner of a corresponding apparatus.

Figure 1:
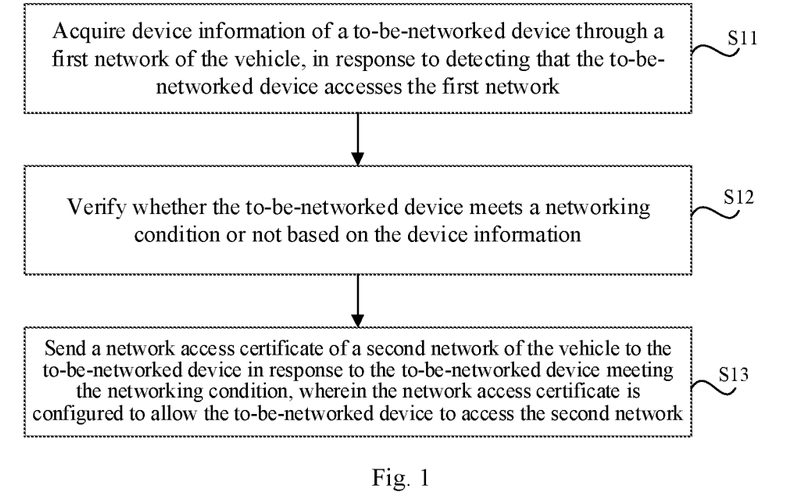
FIG. 1 shows a flow chart of an in-vehicle network access method according to an embodiment.

FIG. 1 shows a flow chart of an in-vehicle network access method according to an embodiment. As shown in FIG. 1, the in-vehicle network access method is performable at a vehicle and includes the following steps.

In step S11: when a to-be-networked device is detected to access a first network of the vehicle, device information of the to-be-networked device is acquired through the first network.

In some embodiments, the to-be-networked device in the embodiment of the present disclosure may be an artificial intelligence+Internet of Things (AIOT) device, the first network is an open wireless network of the vehicle, and since the first network is an open wireless network, the to-be-networked device may directly request to access the first network.

In step S12: it is verified whether the to-be-networked device meets a networking condition or not based on the device information.

In some embodiments, the device information may include, but is not limited to, device identification (device-ID) and a token value of the device. The device-ID of different AIOT devices is different, the device-ID of each AIOT device has a unique value preset in a manufacturing factory of the AIOT device, and the token value can be changed according to whether the device is a networked device or not.

The verifying whether the to-be-networked device meets a networking condition can include: verifying whether the to-be-networked device is networked or not and verifying whether the to-be-networked device is a safety device or not based on the device information of the to-be-networked device. When the to-be-networked device is a safety device and is not networked, the to-be-networked device may be determined to meet the networking condition.

In step S13: a network access certificate of a second network of the vehicle is sent to the to-be-networked device when the to-be-networked device meets the networking condition, in which the network access certificate allows the to-be-networked device to access the second network.

The second network is an encrypted wireless network of the vehicle and is a non-public network, and both the first network and the second network can be Wi-Fi networks in the embodiment of the present disclosure. The network access certificate of the second network includes an SSID and a password of the second network, and the SSID and the password of the second network can be obtained only after the to-be-networked device passes the verification. After the SSID and the password of the second network are obtained, the to-be-networked device may request to the vehicle to access the second network based on the SSID and the password, and after accessing the second network, may access the internet through the second network and interact with a cloud server (which may be provided by a service provider of the vehicle).

In some embodiments, the vehicle may transmit the network access certificate of the second network to the to-be-networked device based on a user datagram protocol (UDP).

With the solution, the to-be-networked device can access the open wireless network of the vehicle firstly, the vehicle verifies the networking condition of the to-be-networked device through the open wireless network, and the vehicle sends the SSID and the password of the encrypted wireless network of the vehicle to the to-be-networked device when the to-be-networked device meets the networking condition, such that the to-be-networked device accesses the encrypted wireless network of the vehicle by using the received SSID and password, the to-be-networked device can automatically access the encrypted wireless network of the vehicle, and a problem that a device without an interaction interface cannot access the vehicle network is solved.

Figure 2:
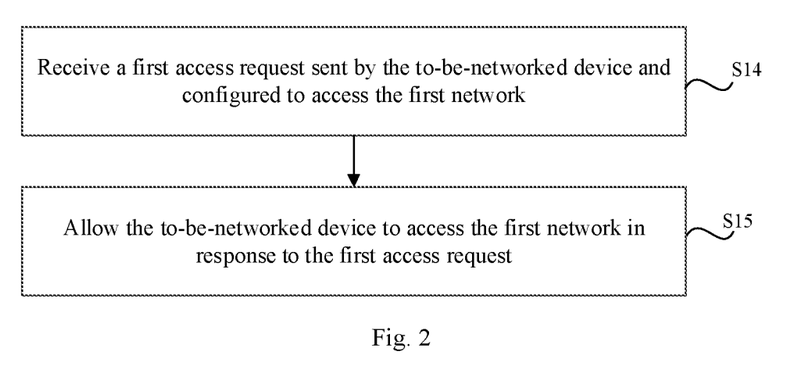
FIG. 2 shows a flow chart of another in-vehicle network access method according to an embodiment.

FIG. 2 shows a flow chart of an in-vehicle network access method according to an embodiment, which is applied to a vehicle. As shown in FIG. 2, before step S11, the method further includes the following steps.

In step S14: a first access request sent by the to-be-networked device and configured to access the first network is received.

An SSID of the first network is a hidden SSID with a fixed name, and the first access request is generated after the to-be-networked device automatically scans the hidden SSID when the to-be-networked device does not access a Wi-Fi network.

In step S15: in response to the first access request, the to-be-networked device is allowed to access the first network.

The open wireless network may be a completely open network; for example, the first network is not encrypted and is open to all devices; or the network can be partially open, which can be realized in the following ways: for example, the first network is not encrypted, but is set as a hidden network, and the SSID thereof is only known by some specific devices; for example, for a vehicle produced by manufacturer A, the first network thereof is provided with a fixed SSID, and the SSID is only known by the AIOT device produced by manufacturer A; for example, the AIOT device produced by manufacturer A pre-stores the SSID of the first network before leaving the factory; or, the first network may be encrypted, and the password thereof is pre-stored in some devices; for example, for a vehicle produced by manufacturer A, the first network thereof is set to have password X by default, and other AIOT devices produced by manufacturer A pre-store the SSID and password X of the first network before leaving a manufacturing factory of the AIOT device, such that the AIOT device actively searches for the first network of the vehicle according to the pre-stored SSID and password X of the first network; or, the first network is not encrypted, but only allows access of some specific devices; for example, for devices with one or more specific brands or models, devices which are safety devices and can access the first network and devices which cannot access the first network can be distinguished according to the device-ID.

In some embodiments, in the embodiment of the present disclosure, the first network may be a local only hot spot (LOHS) of the vehicle, the first network may be preset in a Wi-Fi chip of an in-vehicle infotainment system of the vehicle, the SSID of the first network may be set as a fixed SSID: abcxxxxx123, and the SSID may be set to be hidden; that is, SSID broadcast is not turned on, and encryption is open (which may be understood as no encryption). Correspondingly, in case that a certain to-be-networked device pre-stores the SSID: abcxxxxx123, after a Wi-Fi function of the to-be-networked device is enabled, a Wi-Fi network with the SSID of abcxxxxx123 may be actively searched, and when abcxxxxx123 is scanned, a connection request to the Wi-Fi network corresponding to the SSID is automatically initiated, and at this point, the vehicle may receive the access request initiated by the to-be-networked device for the first network, such that the vehicle allows the to-be-networked device to access the first network in response to the first access request.

In some embodiments, when detecting that the device accesses the first network, the vehicle may be communicated with the to-be-networked device through a channel established by the first network, and the to-be-networked device and the vehicle may be communicated using the UDP; that is, the vehicle may perform communication handshake with a fixed port (for example, a UDP 54321 port) of the to-be-networked device using the UDP, and acquire the device information of the to-be-networked device; in case that the to-be-networked device does not correctly respond to the UDP connection request of the vehicle, the vehicle fails to acquire the device information of the to-be-networked device, and at this point, the vehicle can disconnect the first network from the to-be-networked device.

In an implementation, an in-vehicle Wi-Fi service and a networking program may be deployed in the in-vehicle infotainment system of the vehicle, whether a new AIOT device is connected with the first network in the vehicle is monitored in real time by the in-vehicle Wi-Fi service, and when the in-vehicle Wi-Fi service monitors that the new device accesses the first network, the in-vehicle Wi-Fi service pulls up the networking program for networking the to-be-networked device, and at this point, the to-be-networked device and the networking program of the vehicle can be communicated through the channel established by the first network, and the to-be-networked device and the networking program of the vehicle can be communicated by using the UDP; that is, the above communication handshake is performed with the fixed port of the to-be-networked device using the UDP, so as to obtain the device information of the to-be-networked device; in case that the to-be-networked device does not correctly respond to the handshake request of the networking program, the networking program considers that acquisition of the device information fails, and the first network is disconnected from the to-be-networked device, so as to achieve an aim of forcibly removing the to-be-networked device.

Figure 3:
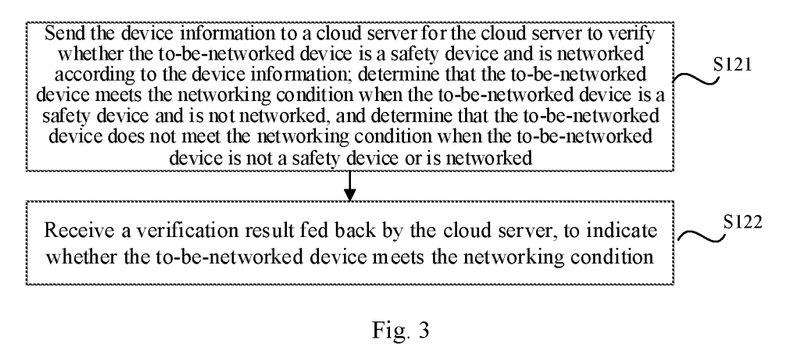
FIG. 3 shows a flow chart of another in-vehicle network access method according to an embodiment.

FIG. 3 shows a flow chart of an in-vehicle network access method according to an embodiment, which is performable at a vehicle, and as shown in FIG. 3, step S12 of verifying whether the to-be-networked device meets a networking condition or not based on the device information may include the following steps.

In step S121: the device information is sent to a cloud server to allow the cloud server to verify whether the to-be-networked device is a safety device and is networked according to the device information; when the to-be-networked device is a safety device and is not networked, it is determined that the to-be-networked device meets the networking condition, and when the to-be-networked device is not a safety device or is networked, it is determined that the to-be-networked device does not meet the networking condition.

In some embodiments, after the vehicle obtains the device information of the to-be-networked device, the device information is sent to the cloud server, a cloud may be an operational technology (OT) cloud corresponding to a manufacturer of the vehicle, and the cloud server is a server responsible for deploying the cloud, and may be one server or a server cluster composed of plural servers. Taking the device-ID and the token value as examples, the cloud may identify whether the device-ID uploaded by the vehicle can be queried at the cloud, that is, whether the device-ID is stored at the cloud, and in case that device-ID consistent with the device-ID is stored at the cloud, it may be determined that the to-be-networked device is a safety device, otherwise, it is determined that the to-be-networked device is a non-safety device; the token value may be binary or hexadecimal, and the cloud may judge whether the to-be-networked device is not networked according to whether the token value is a non-all-0 or all-1 value, and taking the hexadecimal token value as an example, the token value of 0xffff indicates that the token value is an all-1 value, and the to-be-networked device may be determined not to be networked.

When the to-be-networked device is determined to be a safety device and not networked, the to-be-networked device is determined to meet the networking condition. At this point, the cloud establishes a binding relationship between the vehicle and the to-be-networked device according to the device information, and allocates the identity information to the to-be-networked device; in some embodiments, the identity information may include information, such as bind_key and bind_index, allocated to the to-be-networked device; and in case that the to-be-networked device is not a safety device or is networked, the to-be-networked device is determined not to meet the networking condition, and the networking flow is ended at this point.

In step S122: a verification result fed back by the cloud server is received, which indicates whether the to-be-networked device meets the networking condition.

In some embodiments, in order to improve security of information transmission, an OT secure communication channel may be established between the vehicle and the cloud server, and the vehicle may send the device information of the to-be-networked device to the cloud server through the OT secure communication channel, and receive the verification result fed back by the cloud server through the OT secure communication channel. The vehicle analyzes the verification result to determine whether to continuously network the to-be-networked device.

Figure 4:
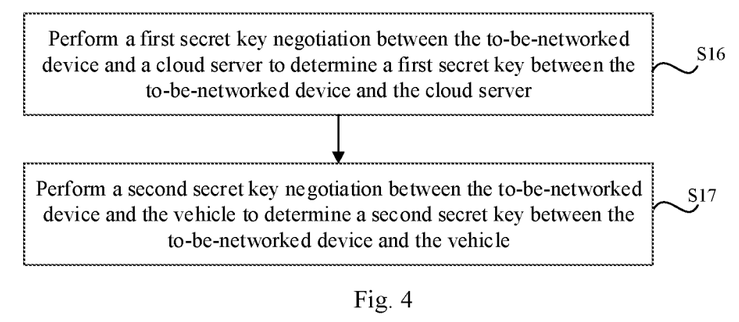
FIG. 4 shows a flow chart of another in-vehicle network access method according to an embodiment.

FIG. 4 shows a flow chart of an in-vehicle network access method according to an embodiment, which is performable at a vehicle, and as shown in FIG. 4, before step S13, the method further includes the following step.

In step S16: a first secret key negotiation between the to-be-networked device and the cloud server is performed to determine a first secret key between the to-be-networked device and the cloud server.

In some embodiments, first, the first secret key negotiation may be performed between the to-be-networked device and the cloud server; in an implementation, the networking program for networking may be deployed in the in-vehicle infotainment system of the vehicle, information of interaction of the to-be-networked device and the cloud server during the first secret key negotiation may be organized by the networking program of the vehicle (for example, the networking program is responsible for forwarding the information of interaction of the to-be-networked device and the cloud server during the first secret key negotiation), and after the negotiation, the first secret key is generated, and the first secret key is stored in each of the to-be-networked device and the cloud server; then, the cloud server may encrypt the identity information (the aforementioned information, such as bind_key and bind_index) of the to-be-networked device through the first secret key to obtain encrypted identity information, and send the encrypted identity information to the vehicle through the OT secure channel.

In step S17: a second secret key negotiation between the to-be-networked device and the vehicle is performed to determine a second secret key between the to-be-networked device and the vehicle.

In some embodiments, the to-be-networked device may further perform the second secret key negotiation with the vehicle, the second secret key negotiation may be performed between the to-be-networked device and the above networking program, and after the negotiation, the second secret key is generated and stored in each of the to-be-networked device and the vehicle (in the networking program), and the second secret key is used for encrypting the network access certificate of the second network by the vehicle.

In some embodiments, in an implementation, after step S16, the method further includes: after the first secret key negotiation, displaying prompt information on a human-computer interaction interface of the in-vehicle infotainment system of the vehicle, such that a user can confirm whether to network the to-be-networked device, and in case that the user selects to agree to network the to-be-networked device through the human-computer interaction interface, continuously executing the step S17; in case that the user selects to disagree to network the to-be-networked device, allowing the vehicle (the networking program thereof) to inform the cloud server of deleting the binding relationship in the server established between the vehicle and the to-be-networked device, inform the cloud server and the to-be-networked device of deleting the first secret key, disconnect the first network and end the networking flow.

In some embodiments, the above step S13 includes: sending the encrypted identity information and an encrypted network access certificate of the second network to the to-be-networked device.

The encrypted network access certificate is obtained by encrypting the network access certificate of the second network by the vehicle through the second secret key, and after receiving the encrypted network access certificate, the to-be-networked device may decrypt the encrypted network access certificate according to the second secret key to obtain the network access certificate of the second network, which includes an SSID and a password of the second network. The encrypted identity information is obtained by encrypting the identity information (i.e., the above information, such as bind_key and bind_index) of the to-be-networked device by the cloud server through the first secret key and sent to the vehicle, and after receiving the encrypted identity information, the to-be-networked device may decrypt the encrypted identity information through the first secret key to obtain the identity information, access the second network using the above network access certificate, and then interact with the cloud server using the identity information.

In some embodiments, the first secret key and the second secret key may also be in an asymmetric encryption form, and the first secret key may be a first secret key pair, and include a first private key and a first public key, and after the first secret key negotiation, the first private key obtained through the negotiation may be stored in the to-be-networked device, the first public key may be stored in the cloud server, the cloud server may encrypt the identity information by using the first public key to obtain the encrypted identity information, and the to-be-networked device may decrypt the encrypted identity information by using the first private key to obtain the identity information; similarly, the second secret key may be a second secret key pair, and includes a second private key and a second public key, the second private key may be stored in the to-be-networked device, the second public key is stored in (the networking program of) the vehicle, the vehicle may encrypt the network access certificate of the second network using the second public key to obtain the encrypted network access certificate, and the to-be-networked device may decrypt the encrypted network access certificate using the second private key to obtain the network access certificate.

Figure 5:
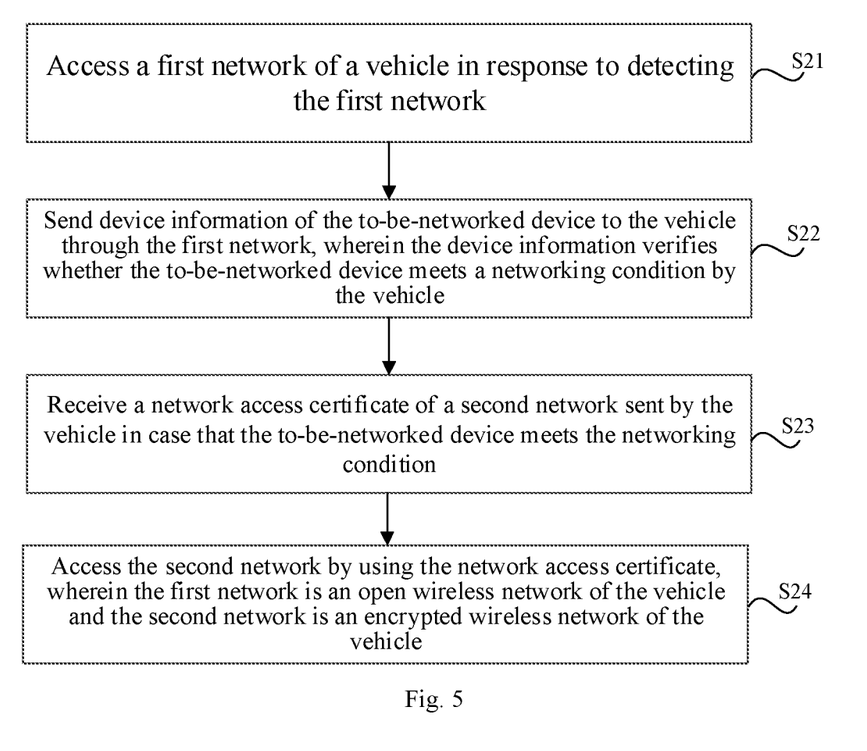
FIG. 5 shows a flow chart of still another in-vehicle network access method according to an embodiment.

FIG. 5 shows a flow chart of an in-vehicle network access method according to an embodiment. As shown in FIG. 5, the method is used for a to-be-networked device and includes the following steps.

In step S21: a first network of a vehicle is accessed when the first network is detected.

In step S22: device information of the to-be-networked device is sent to the vehicle through the first network, in which the device information verifies whether the to-be-networked device meets a networking condition by the vehicle.

In step S23: a network access certificate of a second network sent by the vehicle is received, when the to-be-networked device meets the networking condition.

The above steps S21 to S23 of the method are described above, and specific reference may be made to the steps S11 to S13 of the above method, which are not repeated.

In step S24: the second network is accessed by using the network access certificate; the first network is an open wireless network of the vehicle and the second network is an encrypted wireless network of the vehicle.

In some embodiments, the to-be-networked device may be disconnected from the first network, then access the encrypted second network by using the network access certificate of the second network, and then update the token value.

In some embodiments, before the step S23 of receiving a network access certificate of a second network sent by the vehicle, the method further includes: performing a first secret key negotiation between the to-be-networked device and a cloud server to determine a first secret key between the to-be-networked device and the cloud server; and performing a second secret key negotiation between the to-be-networked device and the vehicle to determine a second secret key between the to-be-networked device and the vehicle.

The methods for the first and second secret key negotiations are described above, and specific reference may be made to the steps S16 to S17 of the above method, which are not repeated.

In some embodiments, based on the first secret key and the second secret key obtained by the first and second secret key negotiations, the step S23 of receiving a network access certificate of a second network sent by the vehicle includes: receiving encrypted identity information and an encrypted network access certificate of the second network which are sent by the vehicle. The encrypted identity information is obtained by encrypting the identity information of the to-be-networked device by the cloud server through the first secret key and sent to the vehicle, the identity information is distributed to the to-be-networked device by the cloud server when the to-be-networked device meets the networking condition, and the encrypted network access certificate is obtained by encrypting the network access certificate of the second network by the vehicle through the second secret key.

Figure 6:
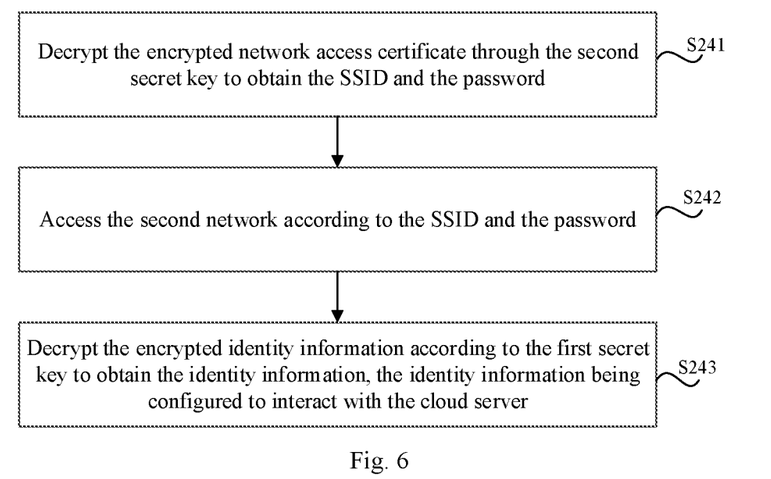
FIG. 6 shows a flow chart of another in-vehicle network access method according to an embodiment.

FIG. 6 shows a flow chart of an in-vehicle network access method according to an embodiment. As shown in FIG. 6, the method is used for a to-be-networked device, and the step S24 of accessing the second network by using the network access certificate (the network access certificate includes an SSID and a password of the second network) may include the following steps.

In step S241: the encrypted network access certificate is decrypted through the second secret key to obtain the SSID and the password.

In s242: the second network is accessed according to the SSID and the password.

In step S243: the encrypted identity information is decrypted according to the first secret key to obtain the identity information for interaction with the cloud server.

The steps S241 to S242 and S243 do not limit an execution order, and one of the steps may be executed first, or the steps may be executed simultaneously.

In some embodiments, after the SSID or the password of the in-vehicle second network is changed, the to-be-networked device may acquire a new SSID and a new password of the second network using the identity information; for example, after the SSID or the password of the second network is changed, any networked device may request a new SSID and a new password from the second network, the request may carry the identity information of the device, and when the vehicle receives the request, the vehicle may send the identity information in the request to the cloud server for verification, and when the cloud server passes the verification of the identity information, the vehicle is instructed to send the new SSID and the new password to the device, such that the device may directly acquire the SSID and the password of the second network without being networked again.

With the solution, the to-be-networked device can access the open wireless network of the vehicle firstly, the vehicle verifies the networking condition of the to-be-networked device through the open wireless network, and the vehicle sends the SSID and the password of the encrypted wireless network of the vehicle to the to-be-networked device when the to-be-networked device meets the networking condition, such that the to-be-networked device accesses the encrypted wireless network of the vehicle by using the received SSID and password, the to-be-networked device can automatically access the encrypted wireless network of the vehicle, and a problem that a device without an interaction interface cannot access the vehicle network is solved.

Figure 7:
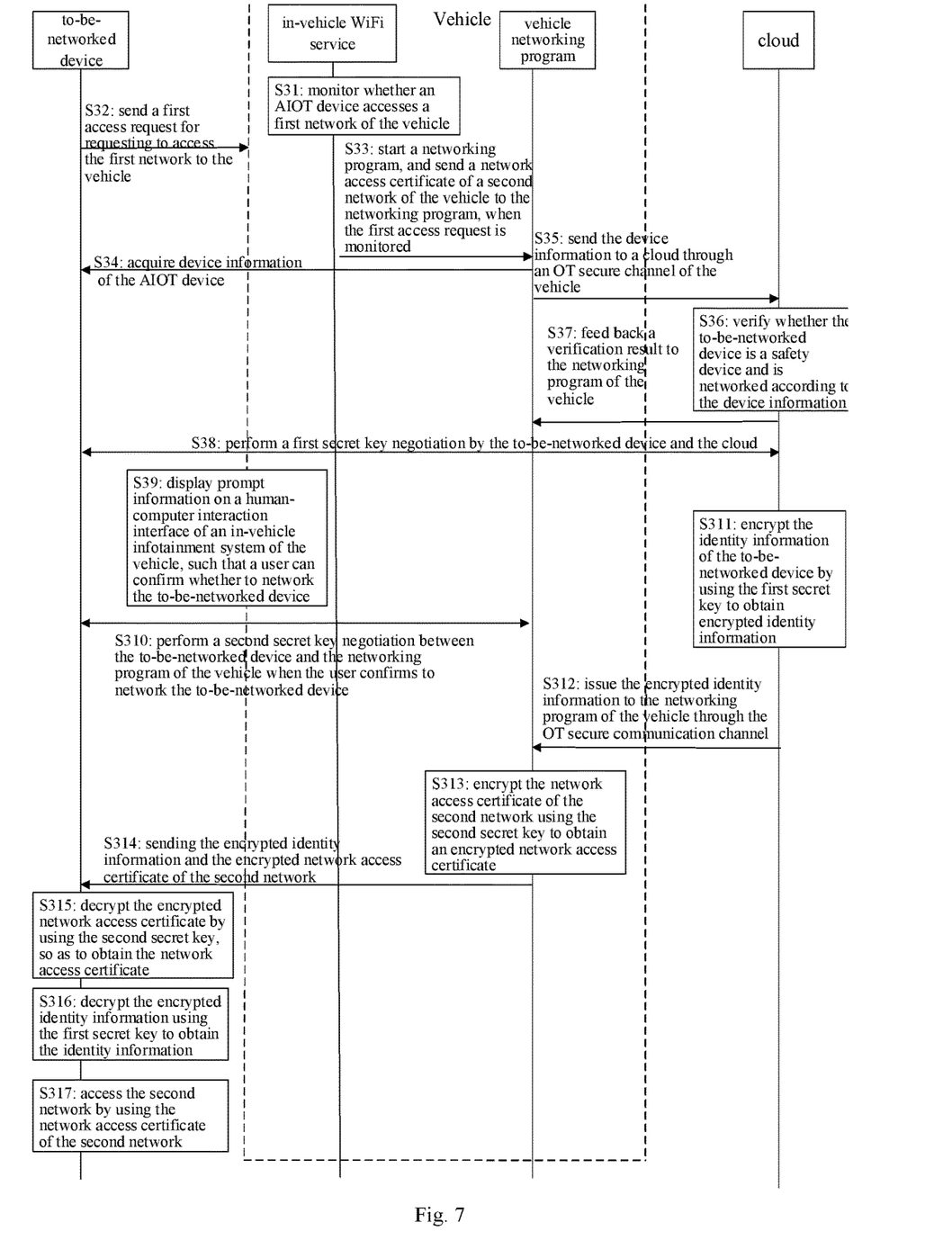
FIG. 7 shows a flow chart of still another in-vehicle network access method according to an embodiment.

FIG. 7 shows a flow chart of an in-vehicle network access method according to an embodiment. As shown in FIG. 7, the method includes the following steps.

In step S31: an in-vehicle Wi-Fi service of a vehicle monitors whether an AIOT device accesses a first network of the vehicle.

For a description of the first network, reference may be made to the content described in the embodiment of FIG. 2, and the description is not repeated.

In step S32: a to-be-networked device sends a first access request for requesting to access the first network to the vehicle.

In step S33: when the in-vehicle Wi-Fi service of the vehicle monitors the first access request, a networking program of the vehicle is started, and a network access certificate of a second network of the vehicle is sent to the networking program.

For introductions of the second network and the network access certificate thereof, reference may be made to the content in step S13, and the introductions are not repeated.

In step S34: the networking program of the vehicle communicates with the to-be-networked device, and device information of the to-be-networked device is acquired.

For a method for communication between the networking program of the vehicle and the to-be-networked device and specific content of the device information, reference may be made to the embodiments as shown in FIG. 2, which will not elaborated herein.

In step S35: the networking program of the vehicle uploads the device information to an OT cloud through an OT secure communication channel between the networking program and a cloud server.

The OT cloud may be deployed in the cloud server, reference may be made to the introduction of the cloud server in step S121, and for the OT channel, reference may be made to the introduction in step S122, and the OT cloud and the OT channel are not repeated.

In step S36: the OT cloud verifies whether the to-be-networked device is a safety device and is networked according to the device information.

For a method for verifying the device information by the OT cloud, reference may be made to the content described in step S121, and the method is not repeated. When the to-be-networked device is a safety device and is not networked, the to-be-networked device is determined to meet a networking condition; and when the to-be-networked device is not a safety device or is networked, the to-be-networked device is determined not to meet the networking condition.

In step S37: the OT cloud feeds back a verification result to the networking program of the vehicle, to indicate whether the to-be-networked device meets the networking condition.

When the verification result indicates that the to-be-networked device is a safety device and is not networked, step S38 is executed, otherwise, the networking flow is ended.

In step S38: a first secret key negotiation is performed by the to-be-networked device and the OT cloud to determine a first secret key between the to-be-networked device and the OT cloud.

In step S39: prompt information is displayed on a human-computer interaction interface of an in-vehicle infotainment system of the vehicle, such that a user can confirm whether to network the to-be-networked device.

In case that the user selects to agree to network the to-be-networked device through the human-computer interaction interface, step S310 is continuously executed; in case that the user selects to disagree to network the to-be-networked device, the vehicle (the networking program thereof) may inform the cloud of deleting a binding relationship in the server established between the vehicle and the to-be-networked device, inform the cloud and the to-be-networked device of deleting the first secret key, disconnect the first network and end the networking flow.

In step S310: a second secret key negotiation between the to-be-networked device and the networking program of the vehicle is performed to determine a second secret key between the to-be-networked device and the networking program of the vehicle.

For methods for the first secret key negotiation and the second secret key negotiation, reference may be made to the above steps S16 to S17, and the methods are not repeated.

In step S311: the OT cloud encrypts the identity information of the to-be-networked device by using the first secret key to obtain encrypted identity information.

In step S312: the OT cloud issues the encrypted identity information to the networking program of the vehicle through the OT secure communication channel.

In step S313: the networking program of the vehicle encrypts the network access certificate of the second network using the second secret key to obtain an encrypted network access certificate.

In step S314: the networking program of the vehicle sends the encrypted identity information and the encrypted network access certificate of the second network to the to-be-networked device.

In step S315: after the to-be-networked device receives the encrypted identity information and the encrypted network access certificate, the encrypted network access certificate is decrypted by using the second secret key, to obtain the network access certificate (i.e., the SSID and the password of the second network).

In step S316: the to-be-networked device decrypts the encrypted identity information using the first secret key to obtain the identity information for interaction with the cloud.

In step S317: the to-be-networked device accesses the second network by using the network access certificate of the second network.

After accessing the second network, the to-be-networked device can normally access the Internet using Wi-Fi provided by the second network, such that a network service provided by the OT cloud can be used.

With the solution, the to-be-networked device can access the open wireless network of the vehicle firstly, the vehicle verifies the networking condition of the to-be-networked device through the open wireless network, and the vehicle sends the SSID and the password of the encrypted wireless network of the vehicle to the to-be-networked device when the to-be-networked device meets the networking condition, such that the to-be-networked device accesses the encrypted wireless network of the vehicle by using the received SSID and password, the to-be-networked device can automatically access the encrypted wireless network of the vehicle, and a problem that a device without an interaction interface cannot access the vehicle network is solved.

Figure 8:
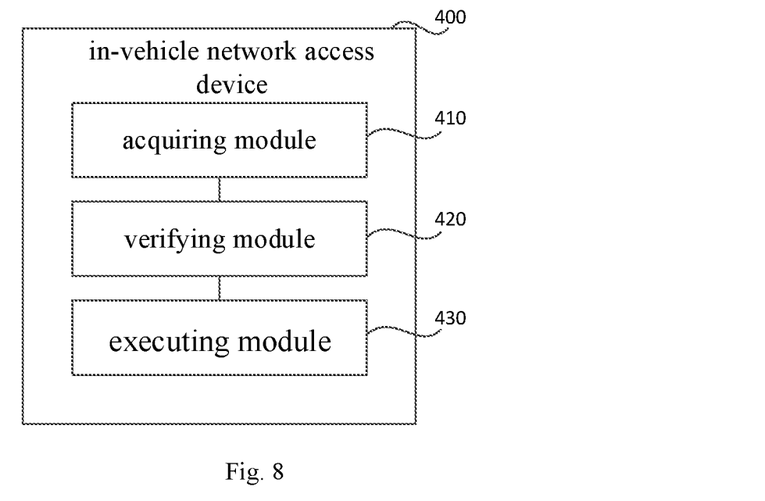
FIG. 8 shows a block diagram of an in-vehicle network access device according to an embodiment.

FIG. 8 shows a block diagram of an in-vehicle network access device according to an embodiment. Referring to FIG. 8, the in-vehicle network access device 400 is performable at a vehicle and includes: an acquiring module 410, a verifying module 420 and an executing module 430.

The acquiring module 410 is configured to, when a to-be-networked device is detected to access a first network of the vehicle, acquire device information of the to-be-networked device through the first network;

The verifying module 420 is configured to verify whether the to-be-networked device meets a networking condition or not based on the device information; and The executing module 430 is configured to send a network access certificate of a second network of the vehicle to the to-be-networked device when the to-be-networked device meets the networking condition, in which the network access certificate allows the to-be-networked device to access the second network, the first network being an open wireless network of the vehicle, and the second network being an encrypted wireless network of the vehicle.

In some embodiments, the in-vehicle network access device 400 further includes an access management module configured to: receive a first access request sent by the to-be-networked device and configured to access the first network; an SSID of the first network being a hidden SSID with a fixed name, and the first access request being generated after the to-be-networked device automatically scans the hidden SSID when the to-be-networked device does not access a Wi-Fi network; and in response to the first access request, allow the to-be-networked device to access the first network.

In some embodiments, the verifying module 420 is configured to: send the device information to a cloud server for the cloud server to verify whether the to-be-networked device is a safety device and is networked according to the device information; when the to-be-networked device is a safety device and is not networked, determine that the to-be-networked device meets the networking condition, and when the to-be-networked device is not a safety device or is networked, determine that the to-be-networked device does not meet the networking condition; and receive a verification result fed back by the cloud server, to indicate whether the to-be-networked device meets the networking condition.

In some embodiments, the in-vehicle network access device 400 further includes a secret key negotiation module configured to: before sending the network access certificate of the second network of the vehicle to the to-be-networked device, perform a first secret key negotiation between the to-be-networked device and a cloud server to determine a first secret key between the to-be-networked device and the cloud server; and perform a second secret key negotiation between the to-be-networked device and the vehicle to determine a second secret key between the to-be-networked device and the vehicle.

In some embodiments, the executing module 430 is configured to: send encrypted identity information and an encrypted network access certificate of the second network to the to-be-networked device. The encrypted network access certificate is obtained by encrypting the network access certificate of the second network by the vehicle through the second secret key; the encrypted network access certificate is decrypted by the to-be-networked device according to the second secret key to obtain the network access certificate, the network access certificate includes an SSID and a password of the second network, the encrypted identity information is obtained by encrypting identity information of the to-be-networked device by the cloud server through the first secret key and is sent to the vehicle, the identity information is distributed to the to-be-networked device by the cloud server when the to-be-networked device meets the networking condition, the encrypted identity information is decrypted by the to-be-networked device according to the first secret key to obtain the identity information, and the to-be-networked device interacts with the cloud server using the identity information after accessing the second network.

Figure 9:
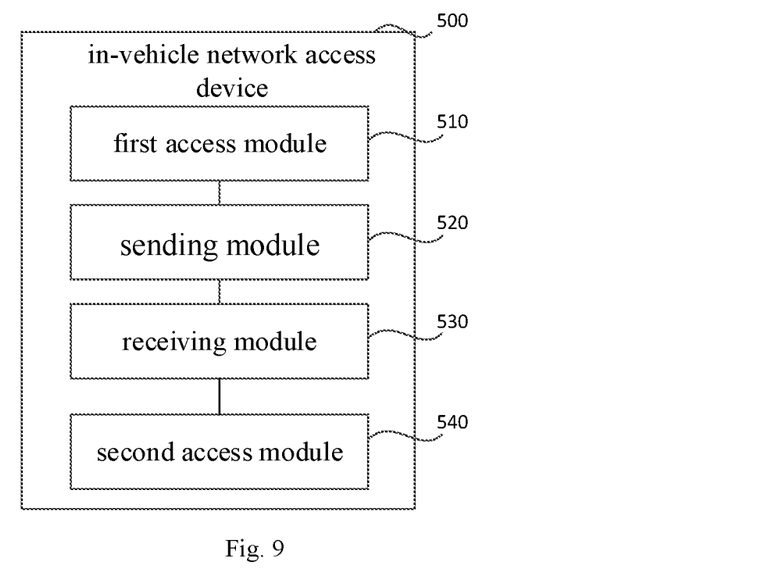
FIG. 9 shows a block diagram of another in-vehicle network access device according to an embodiment.

FIG. 9 shows a block diagram of an in-vehicle network access device according to an embodiment. Referring to FIG. 9, the in-vehicle network access device 500 is performable by a to-be-networked device and includes: a first access module 510, a sending module 520, a receiving module 530 and a second access module 540.

The first access module 510 is configured to access a first network of a vehicle when the first network is detected;

The sending module 520 is configured to send device information of the to-be-networked device to the vehicle through the first network, in which the device information verifies whether the to-be-networked device meets a networking condition by the vehicle;

The receiving module 530 is configured to receive a network access certificate of a second network sent by the vehicle when the to-be-networked device meets the networking condition; and The second access module 540 is configured to access the second network by using the network access certificate; the first network being an open wireless network of the vehicle and the second network being an encrypted wireless network of the vehicle.

In some embodiments, the in-vehicle network access device 500 further includes a secret key negotiation module configured to: before receiving the network access certificate of the second network sent by the vehicle, perform a first secret key negotiation between the to-be-networked device and a cloud server to determine a first secret key between the to-be-networked device and the cloud server; and perform a second secret key negotiation between the to-be-networked device and the vehicle to determine a second secret key between the to-be-networked device and the vehicle.

In some embodiments, the receiving module 530 is configured to: receive encrypted identity information and an encrypted network access certificate of the second network which are sent by the vehicle. The encrypted identity information is obtained by encrypting the identity information of the to-be-networked device by the cloud server through the first secret key and sent to the vehicle, the identity information is distributed to the to-be-networked device by the cloud server when the to-be-networked device meets the networking condition, and the encrypted network access certificate is obtained by encrypting the network access certificate of the second network by the vehicle through the second secret key.

In some embodiments, the second access module 540 is configured to: decrypt the encrypted network access certificate through the second secret key to obtain an SSID and a password; access the second network according to the SSID and the password; and decrypt the encrypted identity information according to the first secret key to obtain the identity information for interaction with the cloud server.

With the solution, the to-be-networked device can access the open wireless network of the vehicle firstly, the vehicle verifies the networking condition of the to-be-networked device through the open wireless network, and the vehicle sends the SSID and the password of the encrypted wireless network of the vehicle to the to-be-networked device when the to-be-networked device meets the networking condition, such that the to-be-networked device accesses the encrypted wireless network of the vehicle by using the received SSID and password, the to-be-networked device can automatically access the encrypted wireless network of the vehicle, and a problem that a device without an interaction interface cannot access the vehicle network is solved.

With regard to the apparatus according to the above embodiment, a specific manner in which each module performs an operation is described in detail in the embodiment of the method, and will not be described in detail here.

The present disclosure further provides a computer-readable storage medium having computer program instructions stored thereon, the program instructions, when executed by a processor, implementing the steps of the in-vehicle network access method according to the present disclosure.

Figure 10:
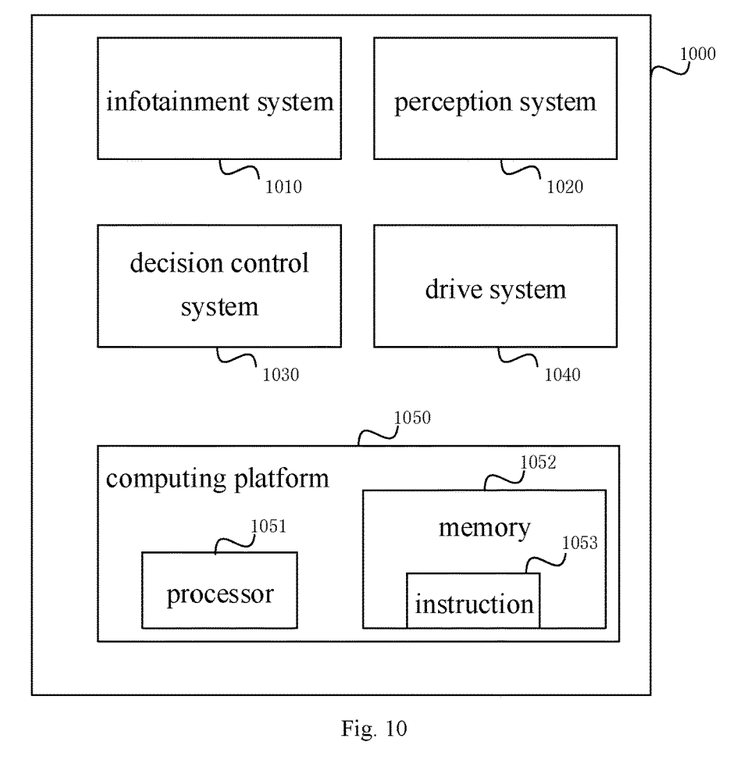
FIG. 10 shows a functional block diagram of a vehicle (a general structure of the vehicle) according to an embodiment.

FIG. 10 shows a functional block diagram of a vehicle 1000 according to an embodiment. For example, the vehicle 1000 may be a hybrid vehicle, a non-hybrid vehicle, an electric vehicle, a fuel cell vehicle, or another type of vehicle. The vehicle 1000 may be an autonomous vehicle, a semi-autonomous vehicle, or a non-autonomous vehicle.

Referring to FIG. 10, the vehicle 1000 may include various subsystems, such as an infotainment system 1010, a perception system 1020, a decision control system 1030, a drive system 1040, and a computing platform 1050. The vehicle 1000 may also include more or fewer subsystems, and each subsystem may include multiple parts. In addition, wired or wireless interconnection may be realized between the subsystems and between the parts of the vehicle 1000.

In some embodiments, the infotainment system 1010 may include a communication system, an entertainment system, a navigation system, or the like.

The perception system 1020 may include several kinds of sensors for sensing information about an environment surrounding the vehicle 1000. For example, the perception system 1020 may include a positioning system (which may be a GPS system, a Beidou system or other positioning systems), an inertial measurement unit (IMU), a laser radar, a millimeter-wave radar, an ultrasonic radar, and a camera shooting apparatus.

The decision control system 1030 may include a computing system, a vehicle control unit, a steering system, a throttle, and a braking system.

The drive system 1040 may include components for providing powered motion for the vehicle 1000. In one embodiment, the drive system 1040 may include an engine, an energy source, a transmission system, and wheels. The engine may be one or a combination of more of an internal combustion engine, an electric motor, and an air compression engine. The engine is capable of converting energy provided by the energy source into mechanical energy.

Some or all of functions of the vehicle 1000 are controlled by the computing platform 1050. The computing platform 1050 may include at least one processor 1051 and a memory 1052, and the processor 1051 may execute instructions 1053 stored in the memory 1052.

The processor 1051 may be any conventional processor, such as a commercially available CPU. For example, the processor may also include a graphic process unit (GPU), a field programmable gate array (FPGA), a system on chip (SOC), an application specific integrated circuit (ASIC), or a combination thereof.

The memory 1052 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

In addition to the instructions 1053, the memory 1052 may store data, such as road maps, route information, a position, direction and speed of the vehicle, or the like. The data stored in the memory 1052 is used by the computing platform 1050.

In the embodiment of the present disclosure, the processor 1051 may execute the instruction 1053 to complete all or part of the steps of the above-described in-vehicle network access method.

Figure 11:
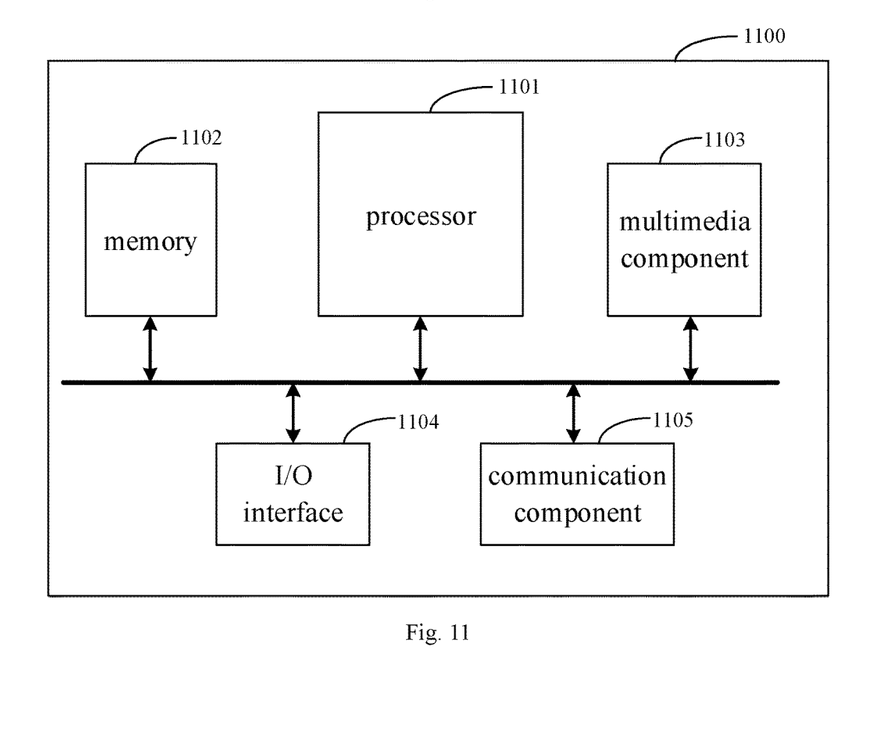
FIG. 11 shows a block diagram of an electronic device according to an embodiment.

FIG. 11 is a block diagram of an electronic device 1100 according to an embodiment. As shown in FIG. 11, the electronic device 1100 may include a processor 1101 and a memory 1102. The electronic device 1100 may also include one or more of a multimedia component 1103, an input/output (I/O) interface 1104, and a communication component 1105. For example, the electronic device 1100 may be the AIOT device as described above and serve as the to-be-networked device in the embodiment of the present disclosure.

The processor 1101 is configured to control an overall operation of the electronic device 1100, so as to complete all or part of the steps in the above in-vehicle network access method. The memory 1102 is configured to store various types of data to support the operation of the electronic device 1100; for example, the data may include instructions for any application or method operating on the electronic device 1100 as well as application-related data, such as contact data, sent and received messages, pictures, audios, videos, or the like. The memory 1102 may be implemented by any type or a combination of volatile and non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk. The multimedia component 1103 may include a screen and an audio component. The screen may be, for example, a touch screen and the audio component is configured to output and/or input audio signals. For example, the audio component may include a microphone for receiving an external audio signal. The received audio signal may be further stored in the memory 1102 or transmitted by the communication component 1105. The audio component 810 further includes a loudspeaker for outputting the audio signals. The I/O interface 1104 provides an interface between the processor 1101 and other interface modules which may be keyboards, mice, buttons, or the like. These buttons may be virtual buttons or physical buttons. The communication component 1105 is configured for wired or wireless communication between the electronic device 1100 and other devices. For example, the wireless communication includes Wi-Fi, Bluetooth, near field communication (NFC), 2G, 3G, 4G, NB-IoT, eMTC, other 5G technologies, or the like, or a combination of one or more of them, which is not limited herein. The corresponding communication component 1105 can therefore include: a Wi-Fi module, a Bluetooth module, an NFC module, or the like.

In an embodiment, the electronic device 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above-mentioned in-vehicle network access method.

In another embodiment, there is further provided a computer-readable storage medium including program instructions which, when executed by a processor, implement the steps of the above-mentioned in-vehicle network access method. For example, the computer-readable storage medium may be the above memory 1102 including program instructions which may be executed by the processor 1101 of the electronic device 1100 to complete the above in-vehicle network access method.

Figure 12:
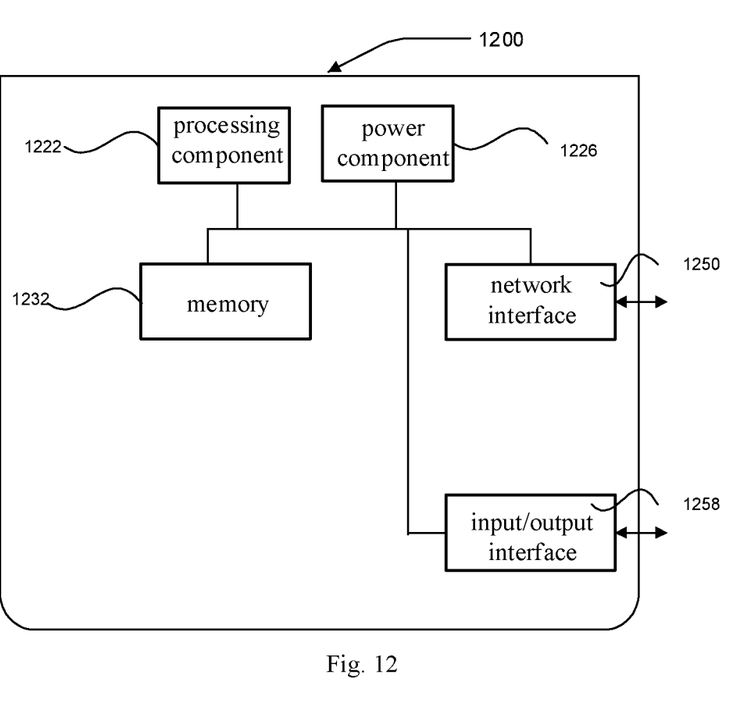
FIG. 12 shows a functional block diagram of a server device (a general structure of a server) according to an embodiment.

FIG. 12 shows a functional block diagram of a server 1200 according to an embodiment. For example, the server 1200 may be the above-mentioned cloud server, that is, may serve as a server for running the above cloud, such as the above-mentioned OT cloud. Referring to FIG. 12, the server 1200 includes a processing component 1222 which further includes one or more processors, and memory resources represented by a memory 1232 and configured to store instructions, such as applications, executable by the processing component 1222. The application stored in the memory 1232 may include one or more modules, each of which corresponds to a set of instructions. Furthermore, the processing component 1222 is configured to execute the instructions to perform the in-vehicle network access methods described above.

The server 1200 may also include a power component 1226 configured to perform power management of the server 1200, a wired or wireless network interface 1250 configured to connect the server 1200 to a network, and an input/output interface 1258. The server 1200 may operate an operating system stored in the memory 1232.

In another embodiment, there is further provided a computer program product, which includes a computer program executable by a programmable apparatus, the computer program having a code portion for performing the above-mentioned in-vehicle network access method when executed by the programmable apparatus.

The embodiment of the present disclosure further provides a vehicle networking system, including the above vehicle 1000, the above electronic device 1100, and the above server 1200.

Other embodiments of the disclosure will be apparent to those skilled in the art from consideration of the specification and practice of the present disclosure. This application is intended to cover any variations, uses, or adaptations of the disclosure following the general principles thereof and including such departures from the present disclosure as come within known or customary practice in the art. The specification and embodiments are considered to be exemplary only, and the true scope of the disclosure are indicated by the following claims.

It will be understood that the disclosure is not limited to the precise structures described above and shown in the drawings, and that various modifications and changes may be made without departing from the scope thereof. The scope of the disclosure is limited only by the appended claims.

What is claimed is:

1. An in-vehicle network access method performable at a vehicle, the method comprising:
   acquiring device information of a to-be-networked device through a first network of the vehicle, in response to detecting that the to-be-networked device accesses the first network;
   verifying whether the to-be-networked device meets a networking condition or not based on the device information; and
   sending a network access certificate of a second network of the vehicle to the to-be-networked device in response to the to-be-networked device meeting the networking condition, wherein the network access certificate allows the to-be-networked device to access the second network,
   wherein the first network is an open wireless network of the vehicle, and the second network is an encrypted wireless network of the vehicle.

2. The in-vehicle network access method according to claim 1, further comprising:
   receiving a first access request sent by the to-be-networked device and configured to access the first network, wherein an SSID of the first network is a hidden SSID with a fixed name, and the first access request is generated after the to-be-networked device automatically scans the hidden SSID when the to-be-networked device does not access a Wi-Fi network; and
   allowing the to-be-networked device to access the first network, in response to the first access request.

3. The in-vehicle network access method according to claim 1, wherein verifying whether the to-be-networked device meets the networking condition or not based on the device information, comprises:

sending the device information to a cloud server for the cloud server to verify whether the to-be-networked device is a safety device and is networked according to the device information; determining that the to-be-networked device meets the networking condition when the to-be-networked device is a safety device and is not networked, and determining that the to-be-networked device does not meet the networking condition when the to-be-networked device is not a safety device or is networked; and receiving a verification result fed back by the cloud server, to indicate whether the to-be-networked device meets the networking condition.

4. The in-vehicle network access method according to claim 1, wherein before sending the network access certificate of the second network of the vehicle to the to-be-networked device, the in-vehicle network access method further comprises:

performing a first secret key negotiation between the to-be-networked device and a cloud server to determine a first secret key between the to-be-networked device and the cloud server; and performing a second secret key negotiation between the to-be-networked device and the vehicle to determine a second secret key between the to-be-networked device and the vehicle.

5. The in-vehicle network access method according to claim 4, wherein sending the network access certificate of the second network of the vehicle to the to-be-networked device comprises: sending encrypted identity information and an encrypted network access certificate of the second network to the to-be-networked device, the encrypted network access certificate is obtained by encrypting the network access certificate of the second network by the vehicle through the second secret key; the encrypted network access certificate is decrypted by the to-be-networked device according to the second secret key to obtain the network access certificate; the network access certificate comprises an SSID and a password of the second network; the encrypted identity information is obtained by encrypting identity information of the to-be-networked device by the cloud server through the first secret key and is sent to the vehicle; the identity information is distributed to the to-be-networked device by the cloud server when the to-be-networked device meets the networking condition; the encrypted identity information is decrypted by the to-be-networked device according to the first secret key to obtain the identity information; and the to-be-networked device interacts with the cloud server using the identity information after accessing the second network.

6. A computer-readable storage medium having computer program instructions stored therein, wherein the program instructions, when executed by a processor, implement steps of the in-vehicle network access method according to claim 1.

7. A chip, comprising a processor and an interface, wherein the processor is configured to read instructions to execute the in-vehicle network access method according to claim 1.

8. An in-vehicle network access method performed by a to-be-networked device, the method comprising:

accessing a first network of a vehicle in response to detecting the first network;

sending device information of the to-be-networked device to the vehicle through the first network, wherein the device information verifies whether the to-be-networked device meets a networking condition by the vehicle;

receiving a network access certificate of a second network sent by the vehicle in response to the to-be-networked device meeting the networking condition; and accessing the second network by using the network access certificate, wherein the first network is an open wireless network of the vehicle and the second network is an encrypted wireless network of the vehicle.

9. The in-vehicle network access method according to claim 8, wherein before receiving the network access certificate of the second network sent by the vehicle, the in-vehicle network access method further comprises:

performing a first secret key negotiation between the to-be-networked device and a cloud server to determine a first secret key between the to-be-networked device and the cloud server; and performing a second secret key negotiation between the to-be-networked device and the vehicle to determine a second secret key between the to-be-networked device and the vehicle.

10. The in-vehicle network access method according to claim 9, wherein receiving the network access certificate of the second network sent by the vehicle comprises: receiving encrypted identity information and an encrypted network access certificate of the second network which are sent by the vehicle, the encrypted identity information is obtained by encrypting the identity information of the to-be-networked device by the cloud server through the first secret key and sent to the vehicle; the identity information is distributed to the to-be-networked device by the cloud server when the to-be-networked device meets the networking condition; and the encrypted network access certificate is obtained by encrypting the network access certificate of the second network by the vehicle through the second secret key.

11. The in-vehicle network access method according to claim 10, wherein the network access certificate comprises an SSID and a password of the second network, and accessing the second network by using the network access certificate comprises:

decrypting the encrypted network access certificate through the second secret key to obtain the SSID and the password;

accessing the second network according to the SSID and the password; and decrypting the encrypted identity information according to the first secret key to obtain the identity information for interaction with the cloud server.

12. An in-vehicle network access device applied to a to-be-networked device, comprising:

a processor; and a memory for storing instructions executable by the processor, wherein the processor is configured to execute a computer program in the memory to implement the in-vehicle network access method according to claim 6.

13. The in-vehicle network access device according to claim 12, wherein the processor is further configured to:

perform a first secret key negotiation between the to-be-networked device and a cloud server to determine a first secret key between the to-be-networked device and the cloud server; and perform a second secret key negotiation between the to-be-networked device and the vehicle to determine a second secret key between the to-be-networked device and the vehicle.

14. The in-vehicle network access device according to claim 13, wherein the processor is further configured to:
receive encrypted identity information and an encrypted network access certificate of the second network which are sent by the vehicle,
the encrypted identity information is obtained by encrypting the identity information of the to-be-networked device by the cloud server through the first secret key and sent to the vehicle; the identity information is distributed to the to-be-networked device by the cloud server when the to-be-networked device meets the networking condition; and the encrypted network access certificate is obtained by encrypting the network access certificate of the second network by the vehicle through the second secret key.

15. The in-vehicle network access device according to claim 14, wherein the network access certificate comprises an SSID and a password of the second network, and
the processor is further configured to:
decrypt the encrypted network access certificate through the second secret key to obtain the SSID and the password;
access the second network according to the SSID and the password; and
decrypt the encrypted identity information according to the first secret key to obtain the identity information for interaction with the cloud server.

16. An in-vehicle network access device applied to a vehicle, comprising:
a processor; and
a memory for storing instructions executable by the processor,
wherein the processor is configured to execute a computer program in the memory to:
acquire device information of a to-be-networked device through a first network, in response to detecting that the to-be-networked device accesses the first network of the vehicle;
verify whether the to-be-networked device meets a networking condition or not based on the device information; and
send a network access certificate of a second network of the vehicle to the to-be-networked device in response to the to-be-networked device meeting the networking condition, wherein the network access certificate allows the to-be-networked device to access the second network, the first network is an open wireless network of the vehicle, and the second network is an encrypted wireless network of the vehicle.

17. The in-vehicle network access device according to claim 16, wherein the processor is further configured to:
receive a first access request sent by the to-be-networked device and configured to access the first network, wherein an SSID of the first network is a hidden SSID with a fixed name, and the first access request is generated after the to-be-networked device automatically scans the hidden SSID in case that the to-be-networked device does not access a Wi-Fi network; and
allow the to-be-networked device to access the first network, in response to the first access request.

18. The in-vehicle network access device according to claim 16, wherein the processor is further configured to:
send the device information to a cloud server for the cloud server to verify whether the to-be-networked device is a safety device and is networked according to the device information; determine that the to-be-networked device meets the networking condition when the to-be-networked device is a safety device and is not networked, and determine that the to-be-networked device does not meet the networking condition when the to-be-networked device is not a safety device or is networked; and
receive a verification result fed back by the cloud server, to indicate whether the to-be-networked device meets the networking condition.

19. The in-vehicle network access device according to claim 16, wherein the processor is further configured to:
perform a first secret key negotiation between the to-be-networked device and a cloud server to determine a first secret key between the to-be-networked device and the cloud server; and
perform a second secret key negotiation between the to-be-networked device and the vehicle to determine a second secret key between the to-be-networked device and the vehicle.

20. The in-vehicle network access device according to claim 19, wherein the processor is further configured to:
send encrypted identity information and an encrypted network access certificate of the second network to the to-be-networked device,
the encrypted network access certificate is obtained by encrypting the network access certificate of the second network by the vehicle through the second secret key; the encrypted network access certificate is decrypted by the to-be-networked device according to the second secret key to obtain the network access certificate; the network access certificate comprises an SSID and a password of the second network; the encrypted identity information is obtained by encrypting identity information of the to-be-networked device by the cloud server through the first secret key and is sent to the vehicle; the identity information is distributed to the to-be-networked device by the cloud server when the to-be-networked device meets the networking condition; the encrypted identity information is decrypted by the to-be-networked device according to the first secret key to obtain the identity information; and the to-be-networked device interacts with the cloud server using the identity information after accessing the second network.

* * * * *